United States Patent [19]

Archer et al.

[11] Patent Number: 4,773,284
[45] Date of Patent: Sep. 27, 1988

[54] APPARATUS FOR CONSTRUCTING TOOLS

[75] Inventors: John R. Archer, Royston Herts; Peter F. Ross, Cambridge, both of United Kingdom

[73] Assignee: Busm Co., Ltd., Leicester, England

[21] Appl. No.: 54,066

[22] Filed: May 19, 1987

Related U.S. Application Data

[63] Continuation of Ser. No. 816,012, Jan. 3, 1986, which is a continuation of Ser. No. 470,384, Feb. 28, 1983, Pat. No. 4,562,754.

[30] Foreign Application Priority Data

Mar. 4, 1982 [GB] United Kingdom ............... 8206355

[51] Int. Cl.$^4$ ............................................. B21D 7/12
[52] U.S. Cl. ........................................ 76/4; 76/107 C; 72/27; 72/28; 72/307
[58] Field of Search .......... 76/107 R, 107 C, 101 SM, 76/4; 72/28, 29, 27, 115, 132, 129, 166, 307, 702

[56] References Cited

U.S. PATENT DOCUMENTS

| | | | |
|---|---|---|---|
| 1,121,377 | 12/1914 | Krentler | 76/107 C |
| 2,281,587 | 5/1942 | Latham | 76/107 C |
| 2,495,221 | 1/1920 | Berlin | 76/107 C |
| 3,823,749 | 7/1974 | Ritter et al. | 72/307 |
| 4,161,110 | 7/1979 | Ritter et al. | 72/28 |

FOREIGN PATENT DOCUMENTS

| | | |
|---|---|---|
| 465107 | 4/1937 | United Kingdom . |
| 524000 | 7/1940 | United Kingdom . |
| 544656 | 4/1942 | United Kingdom . |
| 559373 | 2/1944 | United Kingdom . |
| 906668 | 9/1962 | United Kingdom . |
| 939337 | 10/1963 | United Kingdom . |
| 1011988 | 12/1965 | United Kingdom . |
| 1094060 | 12/1967 | United Kingdom . |
| 1251155 | 10/1971 | United Kingdom . |
| 1351539 | 5/1974 | United Kingdom . |
| 1444902 | 8/1976 | United Kingdom . |
| 1470290 | 4/1977 | United Kingdom . |

Primary Examiner—Roscoe V. Parker
Attorney, Agent, or Firm—Owen J. Meegan; Aubrey C. Brine

[57] ABSTRACT

Apparatus for constructing a press knife for cutting out sheet material such as leather, wherein machine instructions are generated containing data relating to a desired configuration of the press knife for cutting out a particular profile, the machine instructions are supplied to a bending device (36, 38, 40) and to a strip material feed device (62), the feed device supplies the strip material to the bending device so the bends are introduced into the strip material in accordance with the machine instructions, the formed strip material then being cut off from the stock and assembled and fixed to form the desired knife configuration, preferably being fixed around a support plate which is produced by a forming device (30) fed with machine instructions derived from the same source (12) as those controlling the bending and feeding devices.

3 Claims, 3 Drawing Sheets

APPARATUS FOR CONSTRUCTING TOOLS

This application is a continuation of application Ser. No. 816,012, filed Jan. 3, 1986, now abandoned, which is a continuation of Ser. No. 470,384, filed Feb. 28, 1983, now U.S. Pat. No. 4,562,754, dated Jan. 7, 1986.

FIELD OF INVENTION

This invention concerns methods of and apparatus for constructing cutting tools for cutting out areas of sheet material such as leather as a preliminary stage to a manufacturing process.

The invention is of particular application to the construction of press knives for cutting out leather blanks from which boots and shoes can subsequently be constructed.

BACKGROUND TO THE INVENTION

Shoe manufacturers currently manufacture press knives for leather cutting by a manual method using card templates. Variation of style, width and size means that only one knife of each type is usually required and fashion changes demand a regular flow of knives with new profiles.

One present method of manufacturing press knives employs a 'V' block into which a metal blade is bent locally under the action of a foot operated pin or other deflecting device. The operator uses the card templates as a visual guide and by creating a number of local bends at discrete points along the blade produces a profile which approximates adequately to the desired smooth shape of the card template. Where particularly acute bends are required, a combination of heat and broaching together with additional tools enables the operator to produce the substantial deformation without cracking the material.

The blade has to be bent through a greater angle than is actually required in order to allow for springback in the material of the blade. This is achieved through experience and skill of the operator and the continuous visual inspection which he provides.

The profile tolerance achievable with this method is typically plus or minus 0.4 millimeters and a knife for a piece such as an in quarter will require approximately 60 discrete bends.

It is an object of the present invention to provide an automated process and apparatus for manufacturing press knives for cutting leather.

SUMMARY OF THE INVENTION

According to the present invention a method of constructing a press knife for cutting out sheet materials such as leather comprises the steps of:

(1) generating data relating to the outline or profile of a sheet material blank which is to be cut out, (2) converting the data relating to the profile into machine instructions, (3) supplying the machine instructions to a bending machine (4) supplying to the bending machine strip material from which a knife blade is to be formed, (5) advancing the strip material through a bending station in the machine and introducing bends in the strip material under the direction of the machine instructions, (6) cutting off a length of bent strip material corresponding to part or the whole of a knife profile from the remainder of the stock, and (7) assembling the formed strip material around a shaped former or in a jig and fixing the formed strip material into the desired configuration corresponding to said outline or profile.

The method may include the step of fitting the formed strip internally with at least one strengthening member. The latter may be a support plate forming a mounting for prickers, the support plate being shaped with an outline corresponding to the desired configuration of the press knife.

Component parts of the knife may be marked so as to indicate the style and size identifications.

The bending station conveniently consists of a head capable of bending the strip material accurately in either direction and a feed mechanism which can provide precise increments of longitudinal movement between successive bends. The strip material is held against longitudinal movement during bending and the two movements are conveniently controlled by a computer e.g. a microcomputer.

Means for feeding the strip material may comprise a pair of rollers whose rotation is servocontrolled. Such an arrangement is relatively compact but assumes that no slippage or creep can occur between the strip material and the roller surfaces. Any such slippage or creep would cause a reduction in profile accuracy.

An alternative is to use a linear actuator again under positional servocontrol. Such an arrangement conveniently comprises a clamp on a feeding head and a second clamp adjacent to a bending head: the feed head clamp remains actuated during feeding whilst the bending head clamp will release during feeding. Conveniently the feed clamp releases at the end of the actuator stroke and the actuator can then return to its "start" position and reclamp. In such an arrangement a long strip length could be progressively fed through using a relatively short actuator stroke. Such an arrangement is a preferred method of feeding the strip material.

Conveniently the strip material is threaded through slotted guides to eliminate buckling.

The bending station conveniently comprises a snout through which the strip material is fed and a rotatable bending head located below the level of the outlet of the snout (hereinafter referred to as the tip of the snout). A retractable bending pin protrudes upwardly from the bending head, offset from the centre of rotation thereof.

Positioning the pin on one side or the other of the strip material protruding through the snout tip, and rotating the bending head will result in a deflection of the strip material about the snout tip, giving a localised bend.

Conveniently the snout is located above a horizontal table onto which the strip material is fed. Conveniently the upper end of the bending head is flush with the surface of the table and the pin protrudes above the bending head and therefore above the level of the table but is retractable into the bending head so as to allow the pin to be positioned on one side or the other of the strip material as required by retracting the pin into the bending head and rotating the latter so that the pin is moved from one side of the strip to the other.

Conveniently servohydraulic actuators are used for dereeling the strip material from which the cutting blade is to be formed and for advancing the strip material through the snout. Typically a feed mechanism comprises a linear actuator such as a hydraulic cylinder having typically a 500 millimeter stroke.

Conveniently the actuator for the bending head comprises a semi-rotary vane type actuator. Such actuators can provide up to 280° of rotation i.e. plus or minus 140° from centre and this is adequate for all but the most acute bends.

Preferably positional transducers are provided associated with both the feed and bend actuating mechanisms to feed back information to the control system.

The positional transducers may be either digital (for example optical) or analogue (i.e. potentio metric or inductive) devices. Conveniently all such sensitive and readily damaged components are mounted beneath the operating area or table for protection.

Where broaching is required to prevent cracking of the strip material, a broaching head may be incorporated in the feed line upstream from the bending head.

After a blade has been formed, it must be severed from the remainder of the stock of strip material and to this end a high speed edge cutter may be provided for parting of the finished knife from the feed material adjacent to the bending head. Conveniently the edge cutter descends from above the bending head.

After severance, the completed knife blade can either be removed manually, or conveyor means such as a transfer bar may be provided for moving the completed knife blade across the table to an exit chute or collection point.

It will be appreciated that it will not normally be possible to produce a complete closed knife form as a single piece due to the feed guide which protrudes above the level of the table. According to a preferred feature of the invention, each completed knife blade is formed from at least two separate pieces which are subsequently assembled and welded or brazed or otherwise bonded together to form the complete closed knife blade. According to another preferred feature of the present invention apparatus is provided for constructing a support plate for fitting within the knife profile when formed, the latter being secured to the support plate by welding or brazing or other bonding technique.

Preferably a support plate of the type described is constructed by a cutting or milling technique from information derived from the profile information used to form the strip into the knife profile.

A support plate of the type described conveniently includes one or more large apertures to assist removal of the cut sheet material from the knife when in use and such apertures may also serve as location datums for manufacture.

Where pins or so-called prickers are required the holes into which the pins or prickers are to be secured may be machined in at the same time as the apertures are cut.

The cutting of a support plate of the type described may be performed by a flame cutting technique or a plasma cutting technique, NC nibbling, laser cutting or profile milling.

According to another preferred feature of the invention the method of constructing a press knife includes the step of fitting the formed knife blade profile around a support plate itself constructed from information used to form the knife blade and welding or otherwise bonding the support plate to the knife blade material.

Conveniently the blade profile for (or separate parts which will make up the blade profile after being welded or otherwise secured together) are located in a jig around the support plate before the blade profile and the support plate are bonded as by welding.

Marking of the finished cutter is required for the following:
 (1) blade component identification,
 (2) support plate identification,
 (3) assembled knife identification.

Normally, the invention will produce a knife blade in at least two pieces and it is therefore desirable that the individual parts are marked to avoid confusion particularly when a set of knives are being produced consecutively.

Conveniently a pre-set number or a sequential number is applied to the blade material by a punching machine.

In one arrangement all the parts of a knife may be marked with a two digit number which will automatically be incremented by one for each new set of knife parts. It will then be apparent to an operator assembling the knives from the parts, which parts are related. After 100 knives for example have been constructed, the counter will conveniently be re-set to zero and the sequence could be repeated.

Alternatively, a thermal printer may be connected to the bending machine controller and will produce a set of labels, typically self-adhesive labels, together with a knife description and if necessary a profile image which prior to assembly can be attached to the blade set and then bagged or boxed.

Whichever form of identification is used, a similar identification must be provided for marking the support plate so that the appropriate support plate can be selected from making up each knife blade.

Knives constructed in accordance with contemporary techniques carry three sets of marks:
 (a) a reference punch in the side of the blade giving size and pattern numbers,
 (b) size marks in the blade edge to mark the cut leather, and
 (c) a color size mark on the knife face to assist the operator (known as a clicker) in selecting the right knife.

Each of these markings serves a particular function and the invention conveniently provides for a similar set of identification marks to be applied to knives constructed in accordance with the present invention.

Identification marks may, for example, be inserted in the blade edge between the straightening station and the bending head. This will inevitably increase the bending machine complexity however, and will also reduce the rate of bend formation. It will also require human intervention in the data preparation stage to select a "non-visible" portion of the profile where the marks can be placed prior to passing the data to the bender.

Coloring of the blade is most conveniently performed by means of manually painting the blade.

The invention will now be described by way of example with reference to the accompanying drawings in which:

FIG. 1 is a data flow path of a system for forming a press knife, as used by apparatus in accordance with the invention, FIG. 2 is a plan view from above of a bending station of apparatus in accordance with the invention showing the infinite range of curvature through which a strip may be bent, FIG. 3 is a partial cross-section through a bending head at the bending station, and FIG. 4 is a diagrammatic representation of knife blade forming machine forming part of the apparatus according to the invention.

DETAILED DESCRIPTION OF THE DRAWINGS

In FIG. 1, the data flow path of a system incorporating the invention is shown as comprising extraction of data from a computer system at 10 and the analysis and interpretation of the data at 12 to provide three channels of information.

The main channel includes a stage 14 for converting the analysed data to machine increment instructions.

Thereafter these instructions are supplied at 16 to the control of a bending machine with or without broaching.

Where automated inspection of the bending process is provided for, this will occur at 18. After all of the bends have been formed, the bent knife blade parts are cut off at 20 and transferred to an assembly station at 22 where parts of the knife blade are welded together. Thereafter the blade is marked at 24.

Information from the analysis and interpretation stage 12 is also passed by the left-hand channel through a data translation stage 26 to provide information for assembling the parts which go to make up the completed knife blade and this information is supplied as a further input to the assembly stage 22. Lastly, the data from the stage 12 is provided via a data translation stage 28 to provide information from which the support plate can be manufactured. This information is supplied to a support plate manufacturing stage 30 which includes a cutter or like device for removing material from the plate in a correct shape and to a correct size. Holes are formed in the support plate to receive the so-called prickers. The support plates from the manufacturing stage 30 are then supplied as a further input to the assembly stage 22.

FIG. 2 shows somewhat diagrammatically how the strip material can be bent to form the different curves and bends of the knife blade profile. To this end a strip guide 32 serves to constrain a length of strip metal material 34 to move longitudinally along a generally straight path and through the outlet of a snout generally designated 36.

Below the snout 36 is located a bending head spindle 38 which is rotatable or angularly deflectable from a mean position so that an upstanding pin 40 can exert lateral force on the strip material protruding through the snout as at 42, so as to form a bend utilizing a series of short feed steps and small bends.

The bending pin 40 is retractable fully into the rotatable spindle 38 so that the latter can be rotated so as to position the bending pin 40 on the opposite side of the strip 42.

FIG. 3 shows in cross-section how the bending pin 40 protrudes from the spindle 38. The spindle 38 is a cylindrical member having an enlarged radial flange 44 at one end and an aperture through which the pin 40 can protrude.

A hydraulic semi-rotary vane-type actuator 46 rotates the spindle 38 to the desired angular position for engagement with one side or the other of the protruding strip material to bend the latter.

Figure 1:
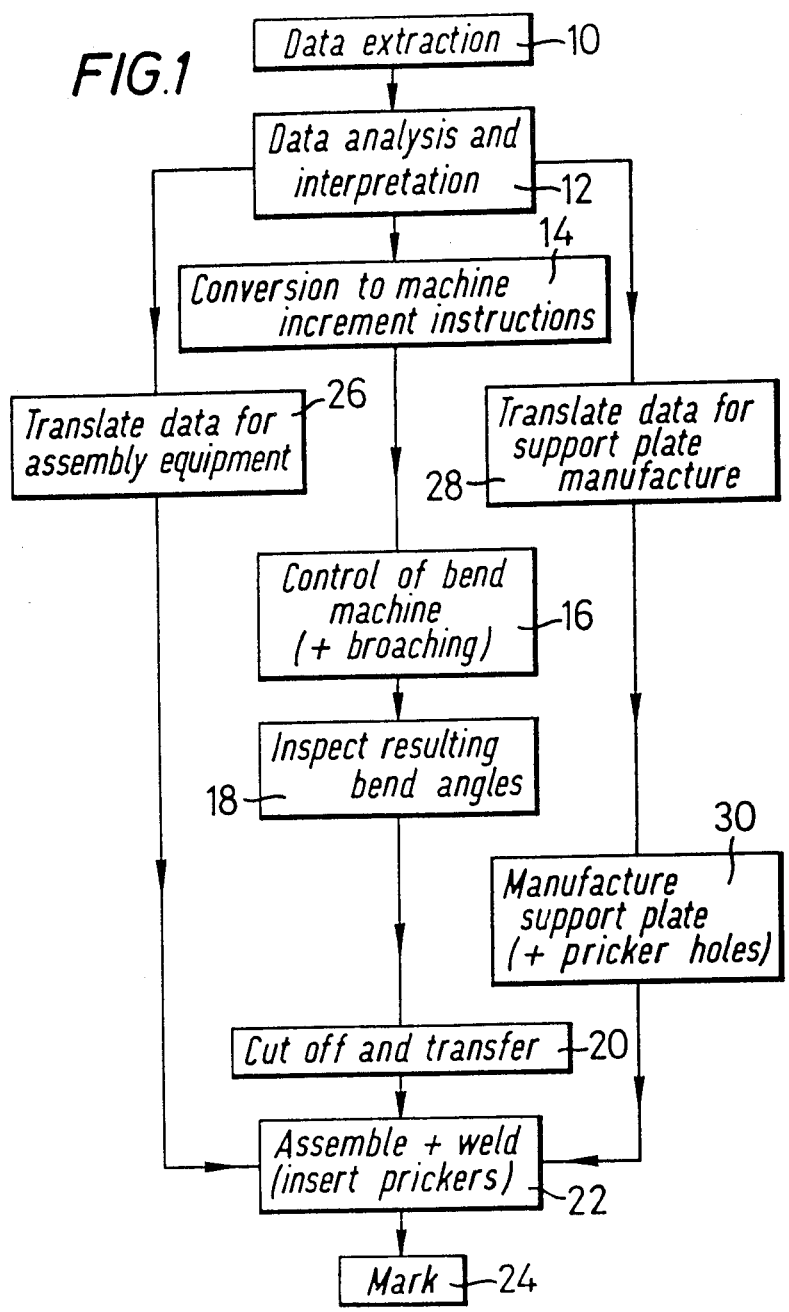

The bending station has a flat table 50 having a guard on four sides at 52, 54, 56 and 58. The table provides a support for a metal strip which strip comprises a portion of the formed blade, part of which can be seen at 70 after it has been bent. Before being bent the strip material is relatively straight as at 60 and has its opposing surfaces oriented vertically. The blade material passes through an actuator 62 for incrementally advancing the material, which is then supplied via the guide 32 to the outlet snout 36. The opposed vertical guide surfaces constrain the vertical strip, as it is advanced, to move longitudinally along a straight line. The pin 40 is spaced from the snout 36 and engages the strip projecting beyond the snout 36.

The signals for the incremental feed actuator 62 and the bending head spindle 38 are derived from a computer, the control panel for which is denoted by reference numeral 72.

The completed blades are severed from the stock strip material by means of a cutting tool (not shown) mounted (together with a cutter tool actuator 74) on a bridge 76 which extends across the width of the platform or table 50.

Conveniently the bridge is moveable so as to allow for a selection of the position at which the cutting tool will operate.

Figure 3:
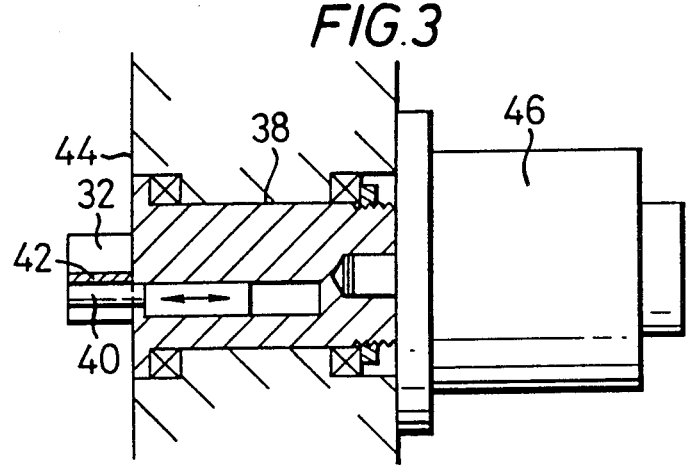
FIG. 3(a) shows details of a preferred construction of the pin 40.
Figure 3A:
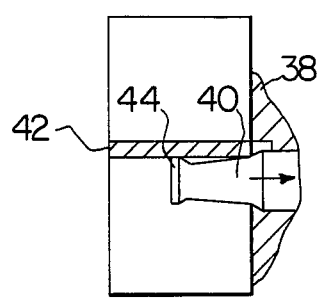
Figure 4:
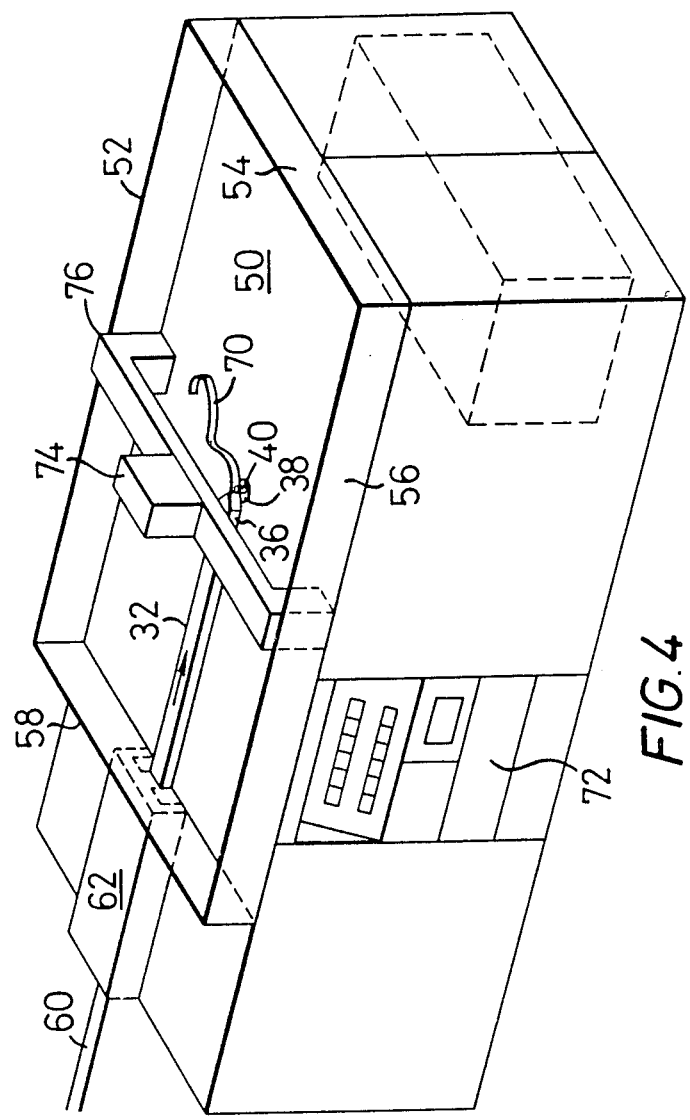
FIG. 4 shows the layout of the incremental bending machine for producing press knife blades.

Although the pin 40 is shown cylindrical in the drawings, it preferably has an enlarged head at its upper end, the head being barrelled so that it makes point contact with the strip substantially halfway up the height of the latter, as shown in FIG. 3(a).

The described machine performs incremental bending, each bend being imparted by bending the strip about the outlet of the snout 36, this outlet being aligned with the pivot axis of the spindle 38.

Figure 2:
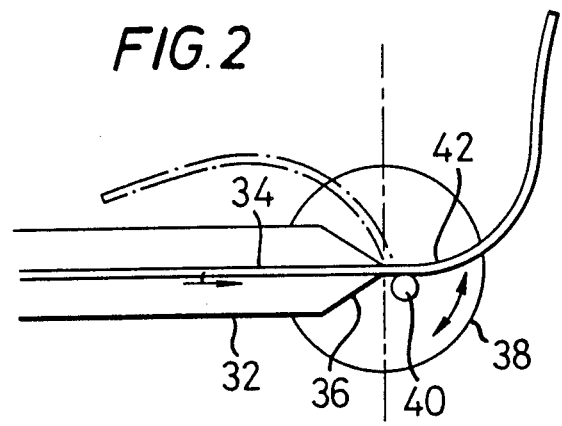

The snout outlet defines the point (in fact, a sharp vertical edge defined by the vertical guide surface and a second vertical surface (where numeral 36 is directed in FIG. 2) which makes an acute angle with the guide surface) about which each increment of bending takes place, but the snout does not limit the amplitude of bend and does not act as a former around which bending takes place. The shape of a complete bend is determined by the magnitudes of the discrete longitudinally spaced bends or longitudinal advances and the magnitudes of the angular deflections, not by the shape of any former or mandrel.

It is preferred for the data relating to the profile of a knife to be formed to be generated and processed in a "main" computer, and to provide a smaller dedicated computer, such as a microcomputer, for controlling the bending machine. The microcomputer then issues the bending instructions in length and angle coordinates, the lengths representing the incremental advances of the strip material and the angles the incremental bends applied by the pin 40. The two computers may be directly linked, but a magnetic storage medium is preferred as this enables the design and bending systems to be run independently.

We claim:

1. Apparatus for bending material in strip form for use in the manufacture of press knives comprising:
   a bending station having a work table means for advancing a strip of material to said bending station;
   guide means for guiding the strip thus advanced, said guide means terminating at the bending station in a snout beyond which the material to be bent projects, and;

a bending tool located at the bending station and cooperable with the snout for bending the projecting strip material, said bending tool comprising a pin which is mounted for movement transversely of the guide means and also heightwise between a projecting position, in which it projects above the surface of the work table, and a retracted position, in which it does not so project, whereby the bending tool can be located at either side of the strip of material projecting from the snout and also can be moved against such strip of material to bend it about the snout, said snout outlet defining a point about which each increment of bending takes place, the arrangement being such that radius of a curve formed in the strip of metal is determined by the magnitude of longitudinal feed of the strip between successive bending operations and the magnitude of the transverse movement of the bending tool in such bending operations.

2. The apparatus according to claim 1 wherein computer control means is provided for controlling the increments of advancing movement effected by the advancing means, the position of the bending tool in relation to the snout prior to a bend being made, and the amount and the direction of transverse movement of the bending tool in accordance with data supplied to the control means and relating to the shape to which the strip of material is to be bent.

3. The apparatus according to claim 1 wherein the bending tool has an enlarged head, the arrangement being such that, where the bending tool projects above the surface of the work table, an edge portion of the enlarged head thereof contacts the strip at a point substantially halfway up the height of such strip.

* * * * *